July 10, 1951   F. R. COLGAN, JR   2,560,276
PRESSURE OPERATED SWITCH

Filed May 12, 1947   3 Sheets-Sheet 2

Inventor:
Fred R. Colgan, Jr.

By: Pierce, Scheffler & Parker,
Attorneys.

July 10, 1951  F. R. COLGAN, JR  2,560,276
PRESSURE OPERATED SWITCH

Filed May 12, 1947  3 Sheets-Sheet 3

Inventor:
Fred R. Colgan, Jr.
By: Pierce, Scheffler & Parker,
Attorneys.

Patented July 10, 1951

2,560,276

UNITED STATES PATENT OFFICE 2,560,276

PRESSURE OPERATED SWITCH

Fred R. Colgan, Jr., Los Angeles, Calif.

Application May 12, 1947, Serial No. 747,530

5 Claims. (Cl. 200—58)

This invention relates to electric signalling or alarm systems and in particular to such systems for automatically notifying the operator of a vehicle equipped with pneumatic tires whenever the inflation pressure of any one of the tires drops below a normal predetermined value considered safe for driving.

An object of the invention is to provide an improved pressure controlled switch for use in signalling systems of the class described, the switch being adapted to be mounted on the rim of each wheel of the vehicle in pressure relation with the inner tube. The new switch may be manufactured at very low cost as compared with other types of switches that have been developed heretofore for such application; it features contacts sealed against ingress of dirt, oil and moisture, has a minimum number of moving parts, is compact in structure and well protected against damage when installed and is most reliable in operation. Furthermore the switch has the additional advantage in that wheels already in use can be modified at but little expense to permit installation of the switch. A more specific object is to provide a switch for tire pressure signalling systems comprising relatively movable contact members carried within and supported by a molded body of resilient material such as rubber, the contact members being actuated relative to each other by deformation of the body member in accordance with variation in pneumatic pressure of the inner tube of the tire. Another object is to provide a switch of the class described in which the contacts may be easily adjusted for operation at different pneumatic pressures.

The foregoing and other objects and advantages to be derived from the invention will become more apparent from the following detailed description of several preferred forms of the switch and the accompanying drawings.

In the drawings Fig. 1 is a diagrammatic view of a tire pressure signalling system in which each of the four wheels of the vehicle is provided with a switch embodying the invention, one of the wheels being shown partly in section to shown installation details;

Figure 1:
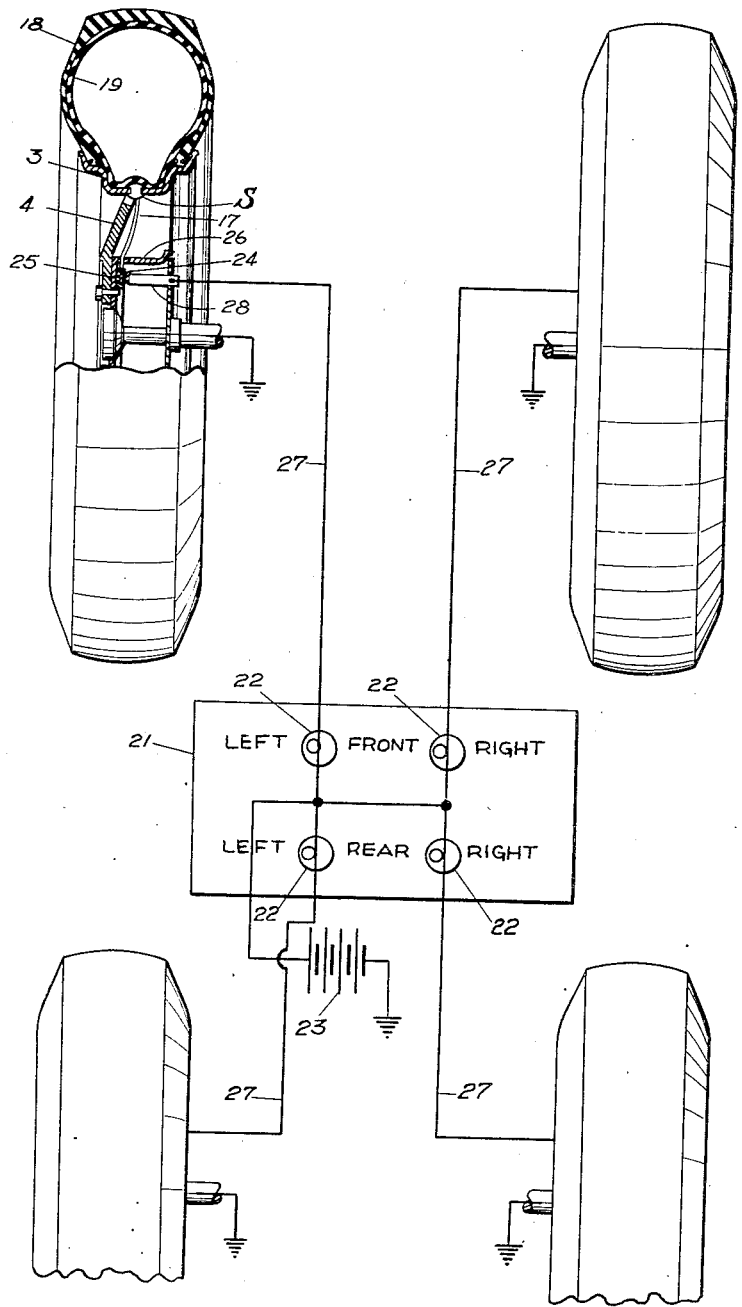
Figure 2:
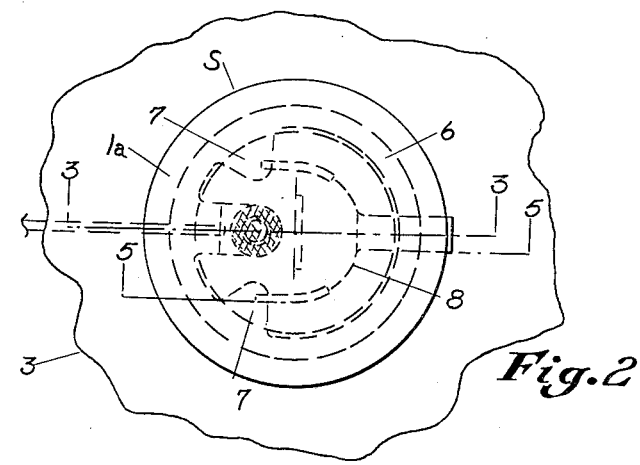
Fig. 2 is a plan view of one form of the switch as installed in the rim portion of the wheel.

Referring now to the drawings and in particular to Figs. 2–7, the switch or actuator unit S for use in the signalling system shown in Fig. 1 for indicating a low-pressure condition in the vehicle tires is seen to be comprised of a cylindrical body $1$ of resilient material such as rubber having upper and lower end flanges $1a$, $1b$ by which the body $1$ is supported within an opening $2$ in the rim $3$ of the vehicle wheel $4$. The opening $2$ in the rim $3$ is so correlated to the diameter of the body $1$ that the latter will be held snugly in place on the rim after it has been installed by deforming the lower flange $1b$ to pass it through the rim opening. The axial length of the body $1$ between the upper and lower flanges $1a$, $1b$ is made substantially equal to the thickness of the rim $3$ so that these flanges will lie substantially flat against the upper and lower surfaces of the rim adjacent the rim opening $2$ notwithstanding the slight curvature of the rim in the rim plane.

The contacts of the switch S which are imbedded in the rubber body $1$ include a substantially annular metallic disc $6$ of conductive material, the outer diameter of which is greater than the diameter of opening $2$ through the rim so that the surface of disc $6$ overlies the marginal surface portions of the rim adjacent the rim opening $2$. The disc contact $6$ thus stiffens the inner flange $1a$ of the rubber body $1$, i. e. the side facing the tire and tube, and serves to prevent the body $1$ from being blown out through the rim hole $2$ under excessive pneumatic pressure in the inner tube.

Disc 6 is provided with a pair of inwardly extending ears 7 which are adapted to be engaged by the movable contact member 8 of the switch. Disc 6 is also provided with a downwardly turned tongue 9, the lower portion of which is bent to lie horizontally and threaded to receive an adjusting screw 10. The inner end of screw 10 is provided with a serrated head 11 and the outer end of the screw which projects outwardly from the body 1 is slotted at 12 to receive a screw driver. More will be said later about the adjusting screw 10 and its function for setting the switch contacts for operation at a selected tire pressure.

Figures 3, 4:
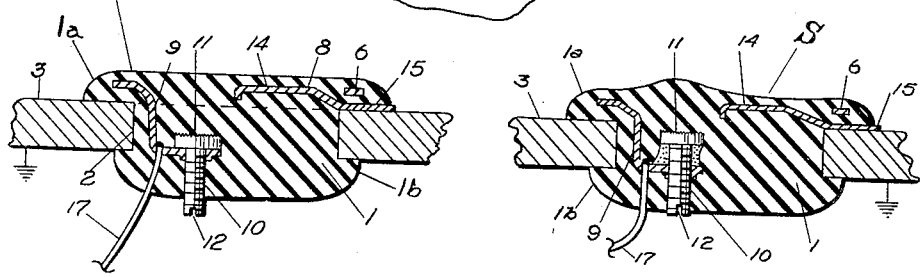
Fig. 3 is a vertical central section taken on line 3—3 of Fig. 2.
Fig. 4 is also a vertical central section taken on line 3—3 of Fig. 2; but with the adjusting screw in a different position to illustrate the manner in which the switch contacts are adjusted for operation at a selected tire inflation pressure.
Figure 5:
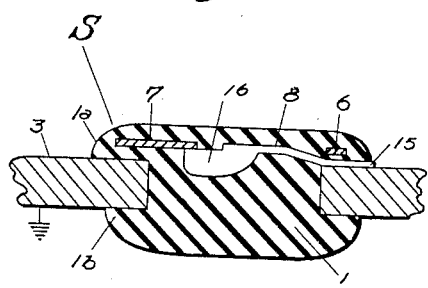
Fig. 5 is a vertical section taken on line 5—5 of Fig. 2 showing the positions of the switch contacts when the molded rubber body member is free from pressure.
Figure 7:
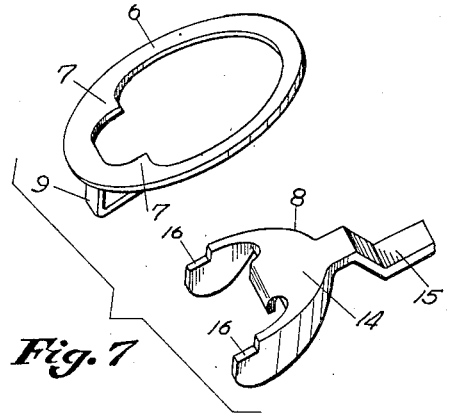
Fig. 7 is a perspective view showing the construction of the contact members of the switch illustrated in Fig. 2.

The movable contact member 8, as seen clearly in Fig. 7, and which like contact member 6 is also imbedded within the rubber body 1, is stamped from flat, electrically conductive, metal plate and thereafter bent to provide a central plate section 14, a tongue 15 and a pair of contact arms 16 which are adapted to move into and out of engagement with the ears 7 of the stationary contact member 6. As seen in Fig. 3, tongue 15 passes beneath the annular contact member 6 and rests in good contact with the outer surface of rim 3.

Prior to molding the rubber body 1, the adjusting screw 10, the ear portions 7 of contact member 6 and the outer ends of contact arms 16 are first coated with a lubricant such as grease to prevent their adherence to the rubber. Screw 10 is then threaded into the tongue 9 until the head 11 contacts the latter. A lead wire 17 is then soldered to the tongue on ring contact 6. The assembly of the ring contact and screw is then positioned in the mold cavity, being supported from the lower end of a screw 10 which is inserted into a close-fitting hole in the bottom of the mold. The wire 17 is led out through another small hole in the mold. The movable contact member 8 is then placed in the mold with the upper edges of the two contact arms 16 in touching engagement with the ears 7 of the ring contact 6. It can be held in this position by the tongue 15 which can be inserted in a close-fitting opening in the side of the mold. The mold is then closed and the rubber introduced in accordance with standard molding practice.

After molding, the only parts protruding from the rubber body 1 will be the lower portion of the adjusting screw 10, wire 17 and the end of the tongue 15 that was inserted in the mold wall for supporting the movable contact member 8 in position while the rubber body 1 was being molded. This end can now be cut off so that it lies substantially flush with the body 1. The switch unit is now complete and can be installed in the wheel rim 3 by forcing the lower flange 1b of the rubber body through the rim opening 2.

Following installation of a switch unit S on the rim of each wheel, the tires 18 and tubes 19 are placed on the rims and inflated to the preselected pressure chosen as the "normal" pressure, and below which it is desired that a signal shall be transmitted to the operator of the vehicle.

Referring now to Fig. 1, the signalling system for the vehicle includes a housing 21 suitable for mounting on or near the instrument panel of the vehicle and which contains an indicating element such as lamp 22 for each one of the wheels. One side of the filament in each of the lamps 22 is connected to the positive terminal of the battery 23, the negative terminal of which is "grounded" to the vehicle frame in accordance with the usual practice followed in the automotive industry. The leads 17 from the stationary contact members 6 of the several switch units S extend to a collector ring 24 set flush with the surface of an annular disc 25 of insulating material which is supported within the brake housing 26 of each wheel, and a lead 27 from the other side of the filament of each of the lamps 22 extends to a brush 28 on each wheel that is supported for sliding engagement with the collector rings 24. The tongue portion 15 of the movable contact member 8 of each switch unit S rests in good contact with the associated rim 3, and since the latter are connected through the axles to the frame of the vehicle, it will be obvious that each of the movable contacts 8 is also at "ground" potential. Thus each of the signal lamps 22 will be lighted from battery 23 when the contact members 6 and 8 of its associated switch unit S are closed, but will be extinguished upon separation of the switch contacts.

Figure 6:
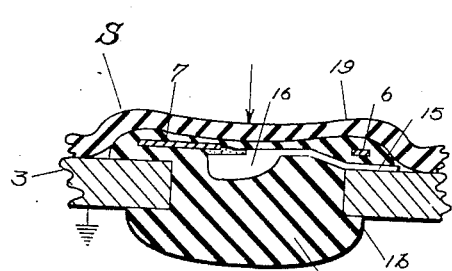
Fig. 6 shows the same section as Fig. 5 but with the molded rubber body subjected to the pressure of the inner tube causing separation of the switch contacts.

The pressure exerted by the inner tube 19 against the upper flange 1a of the switch body 1 will then force the contact arms 16 downwardly as shown in Fig. 6 to disengage them from the ears 7 of the ring member 6. Although the latter also moves downward under the applied inner tube pressure, its displacement will be much less than that of the contact arm end of member 8 since the latter is mounted as a cantilever and hence bends considerably about the tongued supporting end 15 under the comparatively large amount of force applied by the inner tube to the relatively large area central plate section 14. The adjusting screw 10 is now turned with a screw driver to move the screw head 11 away from the tongue 9 and thereby apply pressure upwardly upon an internal portion of the body 1 as shown in Fig. 4 over an area located generally between the contact arms 16, which pressure is of course opposite in direction to the pressure applied downwardly against resilient body 1 by the air pressure in the tube 19. Screw 10 on each switch unit is moved upwardly until the resulting force applied upwardly just exceeds the downward force resulting from the air pressure in the inner tube 19. At this point, the contact arms 16 of the switch will now move upwardly to reengage the ears 7 on the stationary contact member 6 and hence close the corresponding circuit between battery 23 and the related signal lamp 22 causing the latter to light up. The adjusting screw 10 is now backed off slightly until the downward force applied to the resilient body 1 by inner tube 19 slightly exceeds the upward force applied by screw 10 whereupon the contact members 6, 8 of the switch unit S will separate and extinguish the lamp 22. This is the normal operating condition for the indicating system and so long as all the lamps remain unlighted, the operator will know that the air pressure in the tires is not less than the "normal" value preselected by the adjustment of the screws 10. However, should the air pressure in any of the tires fall below the "normal" value, the force applied downwardly on the resilient body 1 will become less than the upward force to which the body 1 is stressed by the adjusting screw 10, with the result that the contact members 6 and 8 of the switch affected will close and light up the corresponding signal lamp 22 to call this fact to the attention of the operator. The serrations on screw head 11 bearing against the rubber body 1 serve to lock the screw 10 against any rotation from its adjusted position that might result from vibration, etc.

Figure 8:
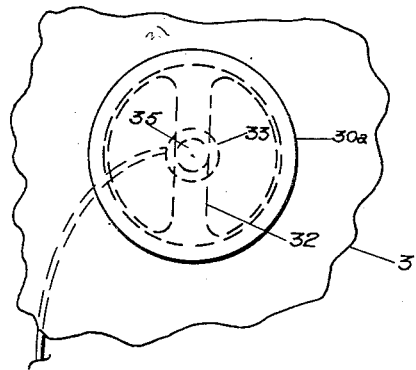
Figs. 8 and 9 are plan and vertical central sections respectively of a modified embodiment of switch incorporating the invention.
Figure 9:
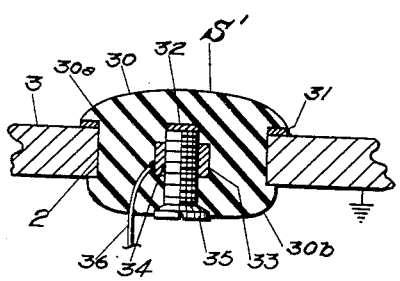

A modified construction of the switch unit in which the switch contacts are maintained slightly separated by a strain in the resilient body when the tire pressure is "normal" but which close upon a drop in tire pressure is shown in Figs. 8 and 9. Here the resilient body 30 of switch unit S' is also seen to be a short cylinder that can be fitted snugly within the opening 2 in rim 3, and is provided with top and bottom flanges 30a, 30b. The stationary contact member consists of an annular disc 31 of relatively stiff metallic material having a diametral contact bridge 32. The annular surface portion of disc 31 lies beneath flange 30a and seats firmly against the upper surface of rim 3 to establish a good electrical contact with the rim which is "grounded" to the frame of the vehicle. The movable contact member is comprised of a cylindrical metallic body member 33 containing an axially extending threaded bore 34 into which is threaded an adjusting screw 35. The switch units S' can be made by the molding process already explained and hence the construction method need not be repeated here. A lead 36 is also soldered to member 33 for connecting the switch unit to the collecting rings in the signalling system previously described.

The switch units S' shown in Figs. 8 and 9 operates in accordance with the same principles governing the operation of the switch unit S previously described. After the tires and tubes have been installed and inflated to the "normal" pressure selected, the pressure exerted by the tube on the exposed upper surface of the body 30 will set up a stress in the central portion of the body below the contact bridge 32 causing this portion to strain in a downward direction and thereby carry the tip of the adjusting screw 35 away from the contact bridge 32 that remains in a substantially fixed position. Screw 35 is now adjusted upwardly until contact with the bridge 32 is reestablished, as indicated by a lighted condition of the corresponding signal lamp 22, and is then backed off slightly until the lamp is extinguished. Should now the tire pressure drop below the value preselected as normal, the strain in the body member 30 will be correspondingly lowered allowing screw 35 to rise until it engages the contact bridge 32 and light the associated signal lamp 22 in the vehicle.

Figure 10:
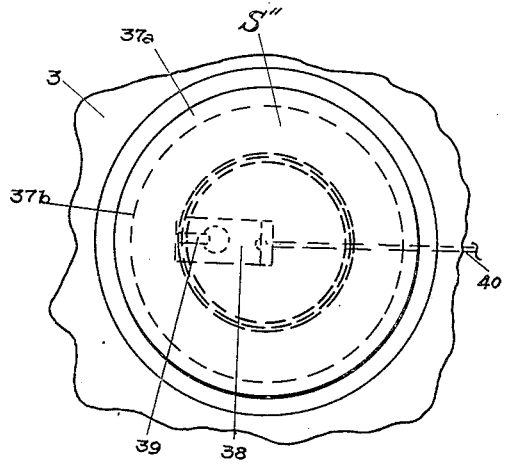
Figs. 10 and 11 are also plan and vertical central sections respectively of still another embodiment of switch constructed in accordance with the invention.
Figure 11:
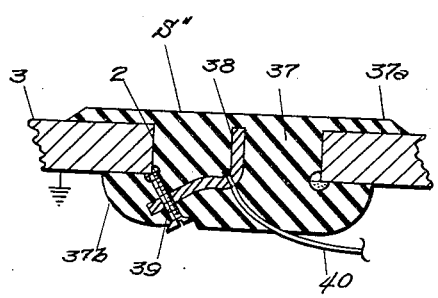

Still another switch unit S" constructed in accordance with the invention is shown in the plan and sectional views of Figs. 10 and 11. Here as in the two other constructions, the switch is comprised of a cylindrical body member 37 of resilient material having an upper flange 37a of a diameter considerably larger than that of the opening 2 in rim 3, and a lower flange 37b. The contact members of the switch include a metallic strip 38 molded centrally within the resilient body 37 in a substantially vertical position, the lower end of strip 38 being bent to lie at a slight angle from horizontal, and which end is drilled and tapped to receive an adjusting screw 39. The lower end of the screw 39 is slotted and protrudes slightly out of the bottom of the resilient body 37 so as to permit adjustment, and the upper end of the screw terminates at the surface of the body 37 at the base of the flange 37b so as to be engageable with the corner of rim 3 at the lower end of rim opening 2. The rim 3 is grounded as in the previously described embodiments of the invention, and a lead 40 is soldered to the strip 38. Operation of the switch unit S" is substantially the same as in the two other switches S and S' previously described. Air pressure in the inner tube is set to the desired normal value causing the central portion of the rubber body 37 to be strained downwardly and thereby move the strip 38 and hence adjusting screw 39 out of engagement with the edge of the rim 3 to break the circuit between the battery 23 and the corresponding lamp 22 in the lamp housing 21. Screw 39 is now adjusted upward until touch contact is again established at the edge of rim 3 and then backed off by a half turn or so. The lamps 22 will now remain unlighted so long as the tire pressure stays at the preselected level. However, should the air pressure in any of the four tires decrease below the preselected normal level, the downward strain in the body member 37 will be decreased correspondingly and allow the upper end of the contact screw 39 to touch the edge of the rim opening thereby completing the circuit between the battery 23 and the associated signal lamp 22 to indicate this condition to the operator of the vehicle.

In conclusion, it will be appreciated that the switch constructions described require but a minimum number of simply designed working parts which when considered with the relatively inexpensive method of assembly by molding makes it possible to produce the switch at a very low overall manufacturing cost. The switch besides being easy and inexpensive to manufacture offers the additional advantages of sealed contacts to keep out dirt, oil and moisture thereby assuring trouble-free operation. Furthermore it will be understood that while in accordance with the patent statutes I have described certain preferred specific switch constructions by which the principles of the invention may be put into practice, it will be evident that minor changes in the construction and arrangement of the switch parts may be made without departing from the spirit and scope of the invention as defined in the appended claims.

I claim:

1. A switch for mounting in an opening through the rim of a vehicle wheel for actuation in response to a change in tire inflation pressure, said switch comprising a body member of resilient insulating material subject to the tire pressure, end flanges on said body member confronting the upper and lower surfaces of said rim adjacent the rim opening, and a pair of cooperative contact members imbedded therein, said contact members being engaged with each other in an undeformed condition of said resilient body member and having different displacement characteristics upon deformation of said body member in response to an application of the tire inflation pressure to thereby obtain a separation of the contact members, and one of said contact members including an annular portion disposed above the upper rim surface and having an outer diameter greater than the diameter of the rim opening.

2. A switch as defined in claim 1 wherein a part of one of said contact members lies in contact with the rim.

3. A switch as defined in claim 1 wherein the contact member including an annular portion is disposed with said annular portion in contact with the rim surface beneath the upper flange on said resilient body to render the contact member substantially stationary upon deformation of said resilient body in response to the inflation pressure of the tire, and the other contact member is movable with the deformed portion of the resilient body to control an electrical circuit established between the two contact members.

4. A switch for mounting in the rim of a vehicle wheel for actuation in response to a change in tire inflation pressure, said switch comprising; a body member of resilient insulating material insertable through an opening in the rim and subject to the tire pressure, upper and lower end flanges on said body member engaging the upper and lower rim surfaces; a first contact member including an annular portion imbedded in the upper flange portion of said resilient body member, the inner diameter of said annular portion being at least equal to the diameter of the rim opening, spaced contact ears, a depending tongue with a horizontal offset and a headed vertical adjustment screw threaded through the horizontal offset of the tongue and located below and intermediate the contact ears; a second contact member imbedded in said resilient body member including a support tongue extending beneath the upper flange on said resilient body member for engagement with the upper surface of the rim, a central plate portion and outer spaced contact arms for engagement with the contact ears of said first contact member, the contact arms of said second contact being displaced relative to the contact ears of said first contact member upon a change in deformation of said resilient body member in response to a change in tire inflation pressure to control an electrical circuit established between said first and second contact members.

5. A switch as defined in claim 1 wherein the contact member including the annular portion also includes a diametral contact portion imbedded in the body member and bridging said annular portion, said annular portion being disposed in contact with the rim surface beneath the upper flange on said body member to render the contact member substantially stationary upon deformation of said resilient body member in response to the inflation pressure of the tire, and wherein the other of said contact members is comprised of a conductive element imbedded in said body member and an adjustable conductive screw threaded through said conductive element for engagement with the diametral contact portion of the other contact member.

FRED R. COLGAN, Jr.

REFERENCES CITED

The following references are of record in the file of this patent:

UNITED STATES PATENTS

| Number | Name | Date |
|---|---|---|
| Re. 10,791 | Kells, Jr. | Dec. 21, 1886 |
| 1,298,420 | Tharp | Mar. 25, 1919 |
| 1,769,427 | Garside | July 1, 1930 |
| 2,244,933 | Armstrong | June 10, 1941 |
| 2,343,060 | Horning | Feb. 29, 1944 |
| 2,367,441 | Schwinn | Jan. 16, 1945 |